(12) United States Patent
Cantlon

(10) Patent No.: US 7,104,738 B2
(45) Date of Patent: Sep. 12, 2006

(54) HOLE SAW ARBOR

(75) Inventor: Nathan Cantlon, Charlo, MT (US)

(73) Assignee: Jore Corporation, Pasco, WA (US)

( * ) Notice: Subject to any disclaimer, the term of this patent is extended or adjusted under 35 U.S.C. 154(b) by 0 days.

(21) Appl. No.: 10/877,801

(22) Filed: Jun. 25, 2004

(65) Prior Publication Data

US 2005/0025592 A1   Feb. 3, 2005

Related U.S. Application Data

(60) Provisional application No. 60/482,983, filed on Jun. 27, 2003.

(51) Int. Cl.
*B23B 51/04* (2006.01)

(52) U.S. Cl. .................. 408/204; 408/239 R; 279/14; 279/145

(58) Field of Classification Search .............. 408/204, 408/206, 207, 209, 703, 239 R, 239 A; 279/14, 279/75, 145
See application file for complete search history.

(56) References Cited

U.S. PATENT DOCUMENTS

| | | | | |
|---|---|---|---|---|
| 3,647,310 A | * | 3/1972 | Morse | .................... 408/239 R |
| 4,303,357 A | * | 12/1981 | Makar | ........................ 408/204 |
| 4,491,443 A | * | 1/1985 | DeCaro | .................. 408/239 A |
| 4,561,507 A | * | 12/1985 | Liou | ......................... 173/93.7 |
| 4,573,839 A | * | 3/1986 | Finnegan | ................ 408/239 R |
| 4,605,348 A | * | 8/1986 | DeCaro | .................. 408/239 A |
| 5,246,317 A | * | 9/1993 | Koetsch et al. | ............. 408/204 |
| 5,470,180 A | * | 11/1995 | Jore | ...................... 408/239 R |
| 5,779,404 A | * | 7/1998 | Jore | ...................... 408/239 R |
| 6,341,925 B1 | * | 1/2002 | Despres | ..................... 408/204 |
| 6,488,452 B1 | * | 12/2002 | Hoskins et al. | ......... 408/239 R |
| 6,623,220 B1 | * | 9/2003 | Nuss et al. | ................. 408/204 |
| 6,641,338 B1 | * | 11/2003 | Despres | ..................... 408/204 |
| 6,761,361 B1 | * | 7/2004 | Taylor et al. | ................. 279/75 |
| 2004/0096286 A1 | * | 5/2004 | Hsiao | ..................... 408/239 R |

* cited by examiner

*Primary Examiner*—Daniel W. Howell
(74) *Attorney, Agent, or Firm*—Christensen O'Connor Johnson Kindness PLLC

(57) ABSTRACT

An arbor (20) for a tool is provided. The arbor includes a shaft (22) and a locking mechanism (24) operatively coupled to the shaft. The arbor also includes an adapter (26) removably coupled to the shaft by the locking mechanism, the adapter being selectively configurable within the shaft between at least a first operating position, where the adapter is configured to secure a first tool accessory (62, 66, or 72) to the arbor, and a second operating position, where the adapter is configured to secure a second tool accessory (62, 66, or 72) different at least in part from the first tool accessory.

22 Claims, 4 Drawing Sheets

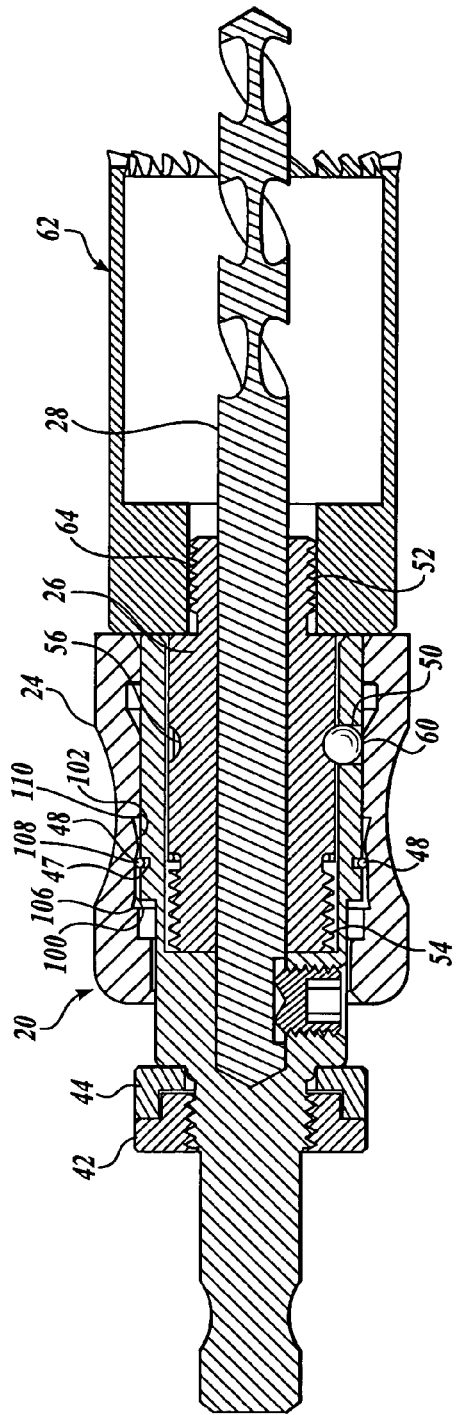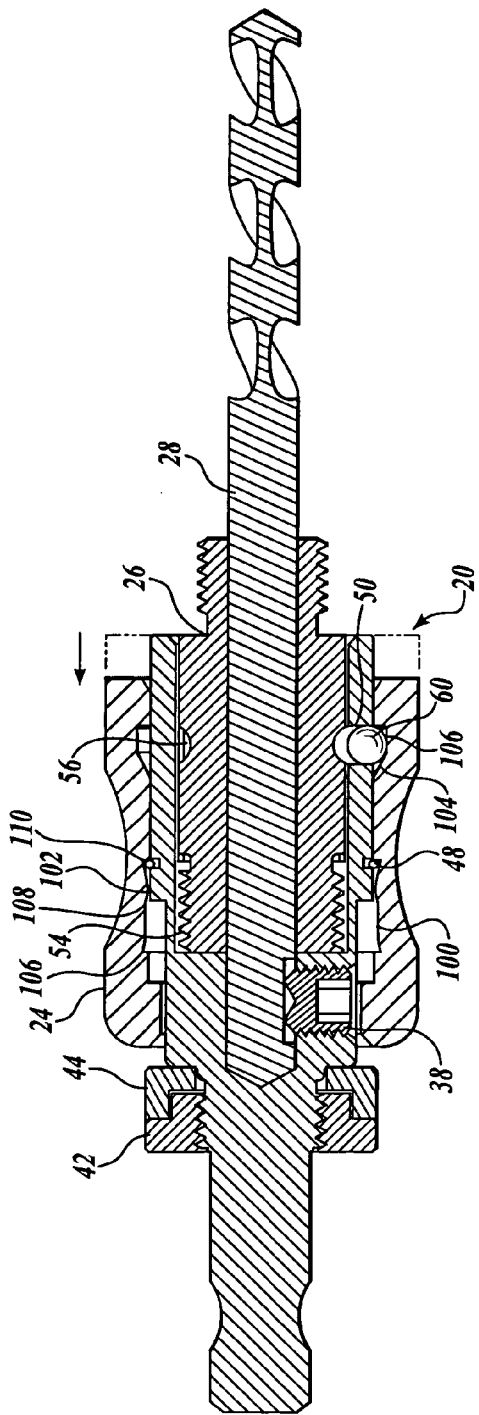

HOLE SAW ARBOR

CROSS-REFERENCE TO RELATED APPLICATION

This application claims the benefit under 35 U.S.C. § 119(e) of Provisional Patent Application No. 60/482,983, filed Jun. 27, 2003, the disclosure of which is hereby expressly incorporated by reference.

FIELD OF THE INVENTION

The present invention relates generally to hole saws and, more particularly, to arbors for anchoring and driving hole saws.

BACKGROUND OF THE INVENTION

A hole saw is a tool used to make cut-outs in a material, such as, for example, wood, steel, fiberglass, and plastic. The hole saw is commonly adaptable to be attached to a hand drill, either power driven or manually operated, in a manner and fashion similar to conventional drill bits and the like. Different styles or sizes of hole saws vary in their mounting configurations, such as the size of the threaded apertures used in coupling the hole saw to the hand drill. For this reason, the tool user often requires an arbor that is specific for each type and/or size of hole saw.

The need to acquire and store a specific arbor for each type or size of hole saw results in additional costs to the user and increases the complexity of using such tools. Thus, there is a need for an arbor that can accommodate different types and sizes of hole saws.

SUMMARY OF THE INVENTION

An arbor for a tool is provided. The arbor includes a shaft having first and second ends, and a locking mechanism operatively coupled to the shaft. The arbor also includes an adapter removably coupled to the shaft by the locking mechanism. The adapter is selectively configurable within the shaft between at least a first operating position, where the adapter is configured to secure a first tool accessory to the arbor, and a second operating position, where the adapter is configured to secure a second tool accessory different at least in part from the first tool accessory.

In one embodiment of the present invention, the first tool accessory includes a different mounting configuration than the second tool accessory. The adapter has a first end for coupling to the first tool accessory and a second end for coupling to the second tool accessory. In yet another embodiment, the adapter is configured between the first operating position and the second operating position by reversing orientation of the first and second ends of the adapter within the shaft.

In still yet another embodiment of the present invention, the arbor includes an adapter nut and a spacer washer releasably coupled to the second end of the shaft. The adapter nut and washer configuration configured to allow coupling of the adapter to a third tool accessory different at least in part from the first and second tool accessories. In certain embodiments, the third tool accessory has a double-D mounting configuration and the adapter nut and spacer washer are configured to allow coupling of the adapter to the double-D mounting configuration on the third tool accessory.

BRIEF DESCRIPTION OF THE DRAWINGS

The foregoing aspects and many of the attendant advantages of this invention will become better understood by reference to the following detailed description, when taken in conjunction with the accompanying drawings, wherein:

FIG. 3 is a cross-sectional side view of the hole saw arbor of FIG. 1 taken substantially through Section A—A of FIG. 1 with the collar in a locked position, and showing an adapter of the hole saw arbor in a first configuration and coupled to a first type of hole saw;

FIG. 4 is a cross-sectional side view of the hole saw arbor of FIG. 1 taken substantially through Section A—A with the collar in an unlocked position;

DETAILED DESCRIPTION OF THE PREFERRED EMBODIMENT

Figure 1:
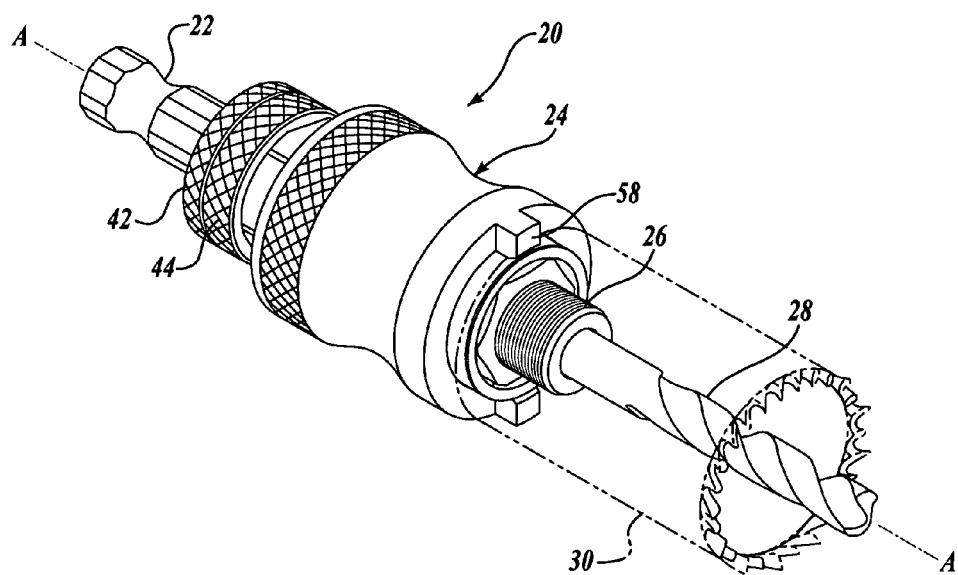
FIG. 1 is an isometric view of a hole saw arbor formed in accordance with one embodiment of the present invention.
Figure 2:
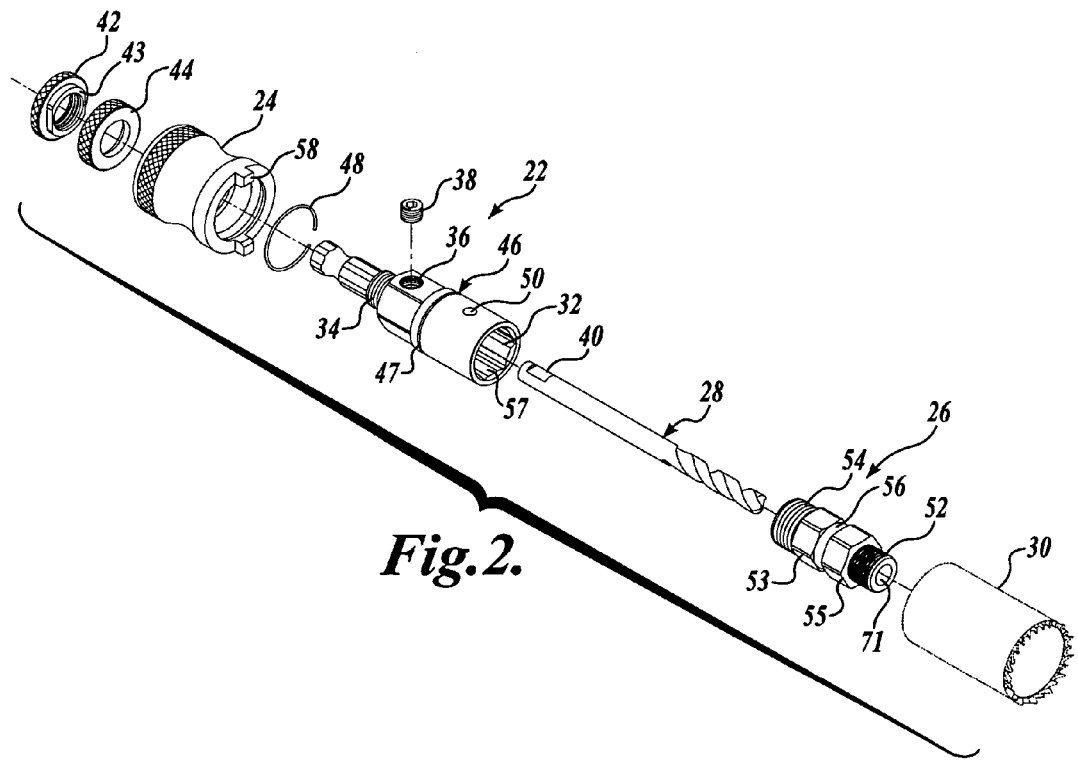
FIG. 2 is an exploded view of the hole saw arbor of FIG. 1.

FIGS. 1–4 illustrate an arbor 20 constructed in accordance with one embodiment of the present invention. The arbor 20 is adapted to selectively attach a hole saw 30 (shown in phantom in FIG. 1) to a drill or driver. Such a drill or driver may be a well-known power or manually driven hand tool and is not shown for ease of description.

The arbor 20 includes a shaft 22, a collar 24, an adapter 26, and a pilot drill bit 28. The shaft 22 includes a cavity 32, a threaded portion 34, an annular groove 47 for receiving a C-ring 48, and a ball retention cavity 50 for restraining a ball 60 between the collar 24 and the adapter 26. The cavity 32 extends at least partially through a longitudinal direction of the shaft 22 and is sized and configured to receive the pilot drill bit 28.

The pilot drill bit 28 is releasably coupled to the shaft 22 by a set screw 38 threadably received within a threaded aperture 36 extending through a portion of the shaft 22. The set screw 38 is seated against a corresponding seating surface 40 formed in one end of the pilot drill bit 28.

Figure 6:
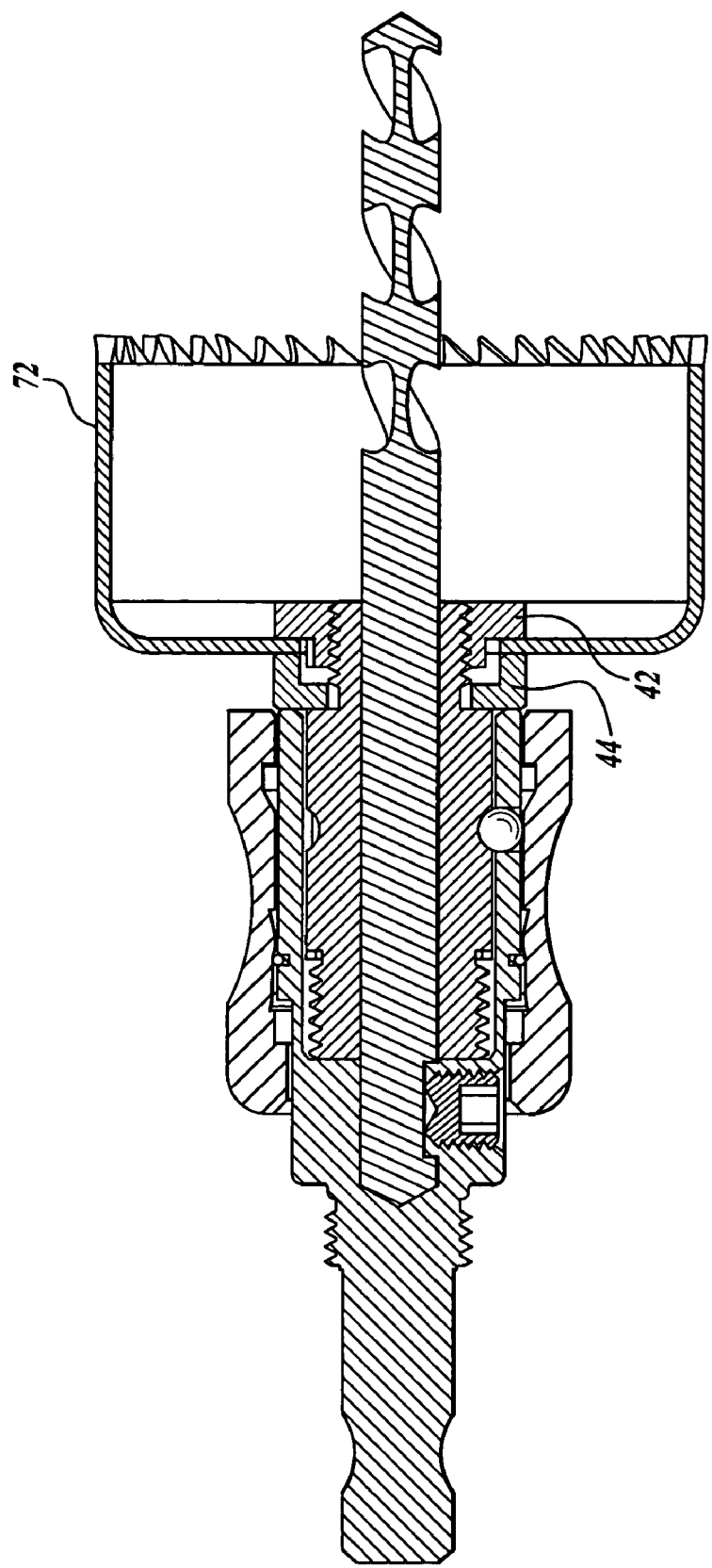
FIG. 6 is a cross-sectional side view of the hole saw arbor of FIG. 1 taken substantially through Section A—A with the collar in a locked position; and showing the adapter of the hole saw arbor in the first configuration and coupled to a third type of hole saw.

The threaded portion 34 of the shaft 22 includes a well-known hex shank sized and configured to be lockingly and operatively received within the drill. The threaded portion 34 is adapted to receive an adapter nut 42 and a spacer washer 44. In some embodiments, one end of the adapter nut 42 has an annular rim known as a double-D portion 43. The double-D portion 43 is configured to cooperate with the spacer washer 44 to couple a hole saw 72 having a double-D mounting configuration to adapter 26, as shown in FIG. 6 and described further below.

As may be best seen by referring back to FIGS. 1–4, the adapter 26 will now be described in greater detail. The adapter 26 includes first and second threaded portions 52 and 54, an annular groove 56, and first and second hex shaped locking portions 53 and 55. The first and second threaded portions 52 and 54 are integrally formed at opposite ends of the adapter 26 and are spaced by the annular groove 56 and the first and second locking portions 53 and 55.

Figure 5:
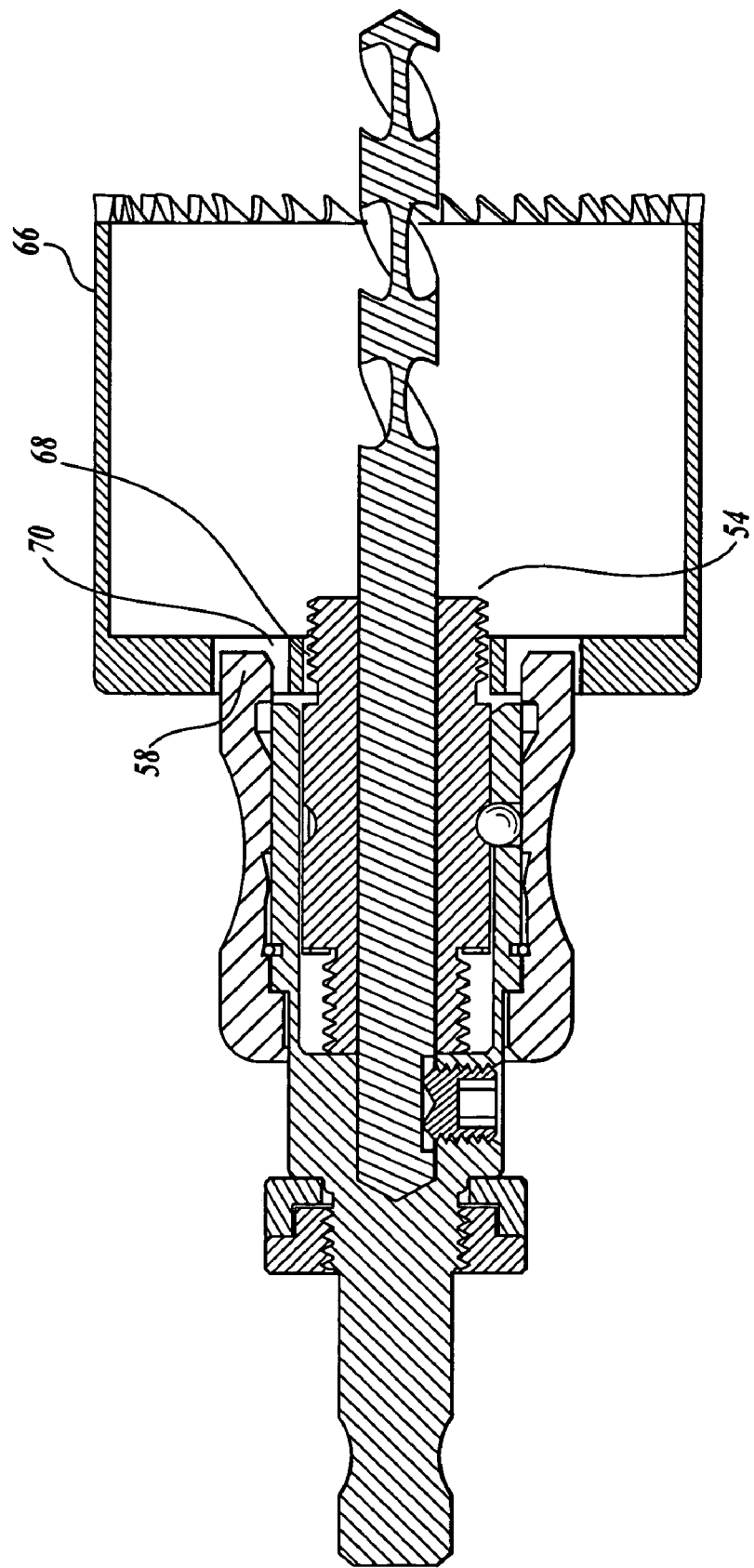
FIG. 5 is a cross-sectional side view of the hole saw arbor of FIG. 1 taken substantially through Section A—A with the collar in a locked position, and showing an adapter of the hole saw adapter in a second configuration and coupled to a second type of a hole saw.

The adapter 26 is sized and configured to be reversibly received within the shaft 22 such that either one of the first or second threaded portions 52 and 54 operatively extend from the adapter 26. As a non-limiting example, the first threaded portion 52 extends from the adapter 26 and is adapted to couple to a hole saw 62 having a threaded aperture 64, as shown in FIGS. 3 and 4 and described below. As another non-limiting example, the second threaded portion 54 extends from the adapter 26 and is adapted to couple to a hole saw 66 having a threaded aperture 68, as shown in FIG. 5 and further described below. The first and second locking portions 53 and 55 are sized and configured to be received within a correspondingly shaped hex end 57 of the shaft 22 for proper torque transfer and attachment the adapter 26 to the hole saw arbor 20.

The adapter 26 is sized to be coaxially aligned with the pilot drill 28. Specifically, when the adapter 26 is received within the hex end 57 of the shaft 22, the pilot drill bit 28 is coaxially received through a channel 71 extending longitudinally through the adapter 26. As such, the pilot drill bit 28 operatively extends from one end of the hole saw arbor 20 for drilling a pilot hole during operation of the hole saw arbor 20. Although the hole saw arbor 20 is illustrated and described as including a pilot drill bit 28, it should be apparent that such a configuration is just one embodiment and that other embodiments, such as a hole saw arbor that does not include a pilot drill bit, are also within the scope of the present invention.

The collar 24 is sized to be slidably received over the shaft 22 and includes two drive posts 58 for couplingly engagement with two corresponding shaped and positioned drive holes 70 in hole saw 66, as shown in FIG. 5 and further described below. The collar 24 has an inner surface that is dimensioned to cooperate with the C-ring 48 disposed within the groove 46 of the shaft 22 and allow the collar 24 to reciprocally move into three positions relative to the shaft 22: a mid-position (locked position) as shown in FIGS. 3 and 6, a back position (unlocked position) as shown in FIG. 4, and a forward position (locked position) as shown in FIG. 5

As may be best seen by referring to FIGS. 3 and 4, the interior surface of the collar 24 also includes a cammed portion 100 annularly formed within the inner diameter of the collar 24. The cammed portion 100 includes a detent 102 providing locking resistance and tactile response when the collar 24 is reciprocated between the forward and back positions. In that regard, as the collar 24 reciprocates over the C-ring 48, the detent 102 provides a sufficient amount of locking resistance to the collar 24, thereby biasing the collar 24 in predetermined positions. The cammed portion 100 includes three detent positions; an aft detent 106, a mid detent 108, and a foreword detent 110.

The aft detent 106 provides a distinct locking position when the collar 24 is in the forward position (FIG. 5). When the collar 24 is in the mid locked position, as illustrated in FIG. 3, the C-ring 48 is disposed within the mid detent 108. Finally, as may be best seen by referring to FIG. 4, when the collar 24 is the unlocked position, the C-ring 48 is disposed within the forward detent 110.

As noted above, the C-ring 48 also provides tactile response to the user when the collar 24 is in the predetermined positional alignment. As the C-ring 48 traverses the detent 102, it is compressed within the annular groove 47 by the detent 102, thereby providing tactile feedback to the end user.

Operation of the arbor 20 may be best understood by referring to FIGS. 3 and 4. When the collar 24 is in the mid-position as shown in FIG. 3, the ball 60 in the cavity 50 of the shaft 22 is in locking engagement with the groove 56 of the adapter 26. The ball 60 lockingly retains the adapter 26 within the cavity 32 by being seated within the groove 56. In order to release adapter 26 from the shaft, the collar 24 is retracted to the back position as shown in FIG. 4.

As the collar 24 is displaced into the back position, the ball 60 traverses down a ramp 104 formed within the inside diameter of the collar 24. The collar 24 is continually drawn into the back position until the ball 60 is fully received within the cavity 50 and is seated against a lip 106 formed within the interior diameter of the collar 24. As seated against the lip 106, the ball 60 is displaced out of locking engagement with the groove 56 formed within the adapter 26, thereby permitting the adapter 26 to be withdrawn from within the cavity 32 of the shaft 22.

The operator may then selectively fully remove the adapter 26 from within the shaft 22, rotate the adapter 26 180 degrees, and reinsert it back into the cavity 32. As configured, the second threaded portion 54 now extends outwardly from the shaft 22, as shown in FIG. 5, for operational engagement with a hole saw. Thus, the adapter 26 includes first and second threaded portions 52 and 54, each adapted to receive hole saws of different sizes. As a non-limiting example, if a hole saw 62 having a threaded aperture 64 of one size diameter and thread count, such as ½" 20-thread, the first threaded portion 52 suitably extends outwardly from the shaft 22. The hole saw 62 is screwed onto the first threaded portion 52 to lockingly retain the hole saw 62 to the arbor 20.

In other embodiments, and as may be best seen by referring to FIG. 5, the adapter 26 may be reversibly placed back into the cavity 32, as described above, such that the second threaded portion 54 having a different diameter and thread count protrudes from the shaft 22. In this embodiment, the collar 24 is displaced into the unlocked position (as illustrated in FIG. 4), and the adapter 26 is withdrawn from within the cavity 32, rotated 180 degrees from its received position, and reinserted back into the cavity 32, such that the second threaded portion 54 extends outwardly from the shaft 22. The collar 24 is then displaced forwardly into the locked position, as illustrated in FIG. 3. In this locked position, a hole saw 66 having a threaded aperture 68 of a different diameter and thread count from the threaded aperture 66 of the hole saw 62 is threadably coupled to the arbor 20.

As received on the second threaded portion 54, the drive posts 58 are aligned with correspondingly shaped and sized drive holes 70 of the hole saw 66, as seen by referring back to FIG. 5. In this configuration, the drive posts 58 of the collar 24 are nested within corresponding drive holes 70 of the hole saw 66 to improve power distribution to the hole saw 66.

Referring now to FIG. 6, a third embodiment of the arbor 20 formed in accordance with the present invention will now be described in greater detail. The arbor 20 of FIG. 6 is identical in materials and operation to the previous embodiments of FIGS. 1–5, with the following exception. In that regard, the adapter nut 42 and space washer 44 may be configured to provide interference and torque transfer to drive the hole saw 72 during operation.

In the present embodiment, the hole saw 72 has a double-D mounting configuration as shown in FIG. 6. The adapter nut 42 and the spacer washer 44 are removed from the threaded portion 34 of the shaft 22. The adapter nut 42 is placed into the hole saw 72 with the double-D portion 43 of adapter nut 42 protruding through a correspondingly shaped double-D attachment hole in hole saw 72. The spacer washer 44 is placed over the protruding double-D portion 43 of adapter nut 42.

The adapter 26 is reinserted into the shaft 22 with the first threaded portion 52 of the adapter 26 protruding from the cavity 32 of shaft 22. The first threaded portion 52 of the adapter 26 is slid through the spacer washer 44 and threaded into adapter nut 42. The collar 24 is then moved back to the mid-position to return the ball 60 into locking engagement with groove 56 of the adapter 26. The hole saw 72 is thereby lockingly attached to the arbor 20.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An arbor for a tool, comprising:
   (a) a shaft having a first end and a second end;
   (b) a locking mechanism operatively coupled to the shaft;
   (c) an adapter removably coupled to the shaft by the locking mechanism, the adapter being selectively configurable within the shaft between at least a first operating position, where the adapter is configured to secure a first tool accessory to the arbor, and a second operating position, where the adapter is configured to secure a second tool accessory; and
   (d) an adapter nut and a spacer washer releasably coupled to the second end of the shaft, the adapter nut and spacer washer configured to allow coupling of the adapter to a third tool accessory different at least in part from the first and second tool accessories.

2. The arbor of claim 1, wherein the first tool accessory having a different mounting configuration than the second tool accessory.

3. The arbor of claim 1, wherein the adapter has a first end for coupling to the first tool accessory and a second end for coupling to the second tool accessory.

4. The arbor of claim 1, wherein the adapter is configured between the first operation position and the second operating position by reversing orientation of the first and second ends of the adapter within the shaft.

5. An arbor for a tool, comprising:
   (a) a shaft having a first end and a second end;
   (b) a locking mechanism operatively coupled to the shaft;
   (c) an adapter removably coupled to the shaft by the locking mechanism, the adapter being selectively configurable within the shaft between at least a first operating position, where the adapter is configured to secure a first tool accessory to the arbor, and a second operating position, where the adapter is configured to secure a second tool accessory; and
   (d) an adapter nut releasably coupled to the second end of the shaft, the adapter nut configured to allow coupling of the adapter to a third tool accessory different at least in part from the first and second tool accessories.

6. The arbor of claim 1, wherein the third tool accessory has a double-D mounting configuration and the adapter nut and spacer washer are configured to allow coupling of the adapter to the double-D mounting configuration on the third tool accessory.

7. The arbor of claim 1, wherein the locking mechanism comprises at least one ball reciprocally received within a cavity formed in the shaft, the ball being positioned for selective locking engagement with a groove on the adapter.

8. The arbor of claim 1, further comprising a collar slidably received on the shaft.

9. The arbor of claim 8, wherein the locking assembly cooperates with the sliding movement of the collar to automatically reciprocate the locking mechanism between a locked and an unlocked position.

10. The arbor of claim 8, wherein the collar further comprises two drive posts for couplingly engaging with two corresponding shaped drive holes in the first or second tool accessory.

11. The arbor of claim 1, wherein at least one of the first and second tool accessories is a hole saw.

12. The arbor of claim 1, wherein the third tool accessory is a hole saw.

13. An arbor for a hand tool, comprising:
   (a) a shaft having a first end and a second end;
   (b) a locking mechanism operatively coupled to the shaft;
   (c) an adapter removably coupled to the shaft by the locking mechanism, the adapter having a first end configured to secure a hand tool accessory having a first mounting configuration to the shaft and a second end configured to secure a hand tool accessory having a second mounting configuration, wherein the orientation of the first and second ends of the adapter is selectively reversible within the shaft; and
   (d) an adapter nut a spacer washer releasably coupled to the second end of the shaft, the adapter nut and washer configured to allow coupling of the adapter to a hand tool accessory having a third mounting configuration different at least in part to the first and second mounting configurations.

14. An arbor for a tool, comprising:
   (a) a shaft having a first end and a second end;
   (b) a locking mechanism operatively coupled to the shaft;
   (c) an adapter removably coupled to the shaft by the locking mechanism, the adapter being selectively configurable within the shaft between at least a first operating position, where the adapter is configured to secure a first tool accessory to the arbor, and a second operating position, where the adapter is configured to secure a second tool accessory; and
   (d) a collar slidably received on the shaft, wherein the collar includes two drive posts for couplingly engaging with two corresponding shaped drive holes in the first or second tool accessory.

15. The arbor of claim 13, wherein the third hand tool accessory has a double-D mounting configuration and the adapter nut and spacer washer are configured to allow coupling of the adapter to the double-D mounting configuration on the third hand tool accessory.

16. The arbor of claim 13, wherein the locking mechanism comprises at least one ball reciprocally received within a cavity formed in the shaft, the ball being positioned for selective locking engagement with a groove on the adapter.

17. The arbor of claim 13, further comprising a collar slidably received on the shaft.

18. The arbor of claim 17, wherein the locking assembly cooperates with the sliding movement of the collar to automatically reciprocate the locking mechanism between a locked and an unlocked position.

19. The arbor of claim 17, wherein the collar further comprises two drive posts for couplingly engaging with two corresponding shaped drive holes in the first or second hand tool accessory.

20. The arbor of claim 13, wherein at least one of the hand tool accessories is a hole saw.

21. The arbor of claim 13, wherein the hand tool accessory is a hole saw.

22. An arbor for a hand tool, comprising:
(a) a shaft having a first end and a second end;
(b) a locking mechanism operatively coupled to the shaft;
(c) an adapter removably coupled to the shaft by the locking mechanism;
(d) means to configure the adapter to secure hand tool accessories having at least two different mounting configurations to the shaft; and
(e) means for securing to the adapter a third tool accessory different at least in part from the first and second tool accessories.

* * * * *